United States Patent
Sugiyama et al.

(10) Patent No.: US 8,958,952 B2
(45) Date of Patent: Feb. 17, 2015

(54) AUXILIARY POWER SUPPLY DEVICE AND ELECTRIC POWER STEERING SYSTEM INCLUDING AUXILIARY POWER SUPPLY DEVICE

(71) Applicant: JTEKT Corporation, Osaka-shi, Osaka (JP)

(72) Inventors: Toyoki Sugiyama, Kitakatsuragi-gun (JP); Masayasu Higashi, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/161,983

(22) Filed: Jan. 23, 2014

(65) Prior Publication Data

US 2014/0222294 A1 Aug. 7, 2014

(30) Foreign Application Priority Data

Feb. 1, 2013 (JP) .................................. 2013-018359

(51) Int. Cl.
  *A01B 69/00* (2006.01)
  *B62D 6/00* (2006.01)
  *B62D 5/04* (2006.01)

(52) U.S. Cl.
  CPC ..... *B62D 6/00* (2013.01); *B62D 5/046* (2013.01); *B62D 5/0481* (2013.01)
  USPC .......................................................... 701/42

(58) Field of Classification Search
  None
  See application file for complete search history.

(56) References Cited

U.S. PATENT DOCUMENTS

| 5,929,591 | A | * | 7/1999 | Katou et al. | 318/723 |
| 7,200,474 | B2 | * | 4/2007 | Motozawa et al. | 701/45 |
| 8,504,247 | B2 | * | 8/2013 | Yamashita | 701/43 |
| 2005/0131606 | A1 | * | 6/2005 | Motozawa et al. | 701/45 |
| 2011/0066331 | A1 | * | 3/2011 | Yamashita | 701/42 |

FOREIGN PATENT DOCUMENTS

JP A-2009-166679 7/2009

* cited by examiner

*Primary Examiner* — Thomas Tarcza
*Assistant Examiner* — Adam Alharbi
(74) *Attorney, Agent, or Firm* — Oliff PLC

(57) ABSTRACT

An auxiliary power supply device includes a capacitor that is connected to a main power source, and that is able to discharge an electric current to an electric motor, the main power source supplying electric power to the electric motor; and a booster circuit that boosts a voltage of the main power source and applies the boosted voltage to the auxiliary power source. An operation of the auxiliary power supply device is controlled by a control device. When supply of the electric power from the main power source to the capacitor is started in a state where a voltage across terminals of the capacitor is equal to or higher than a voltage of the main power source, the control device increases the voltage applied to the capacitor by the booster circuit as the capacitor voltage increases.

10 Claims, 10 Drawing Sheets

AUXILIARY POWER SUPPLY DEVICE AND ELECTRIC POWER STEERING SYSTEM INCLUDING AUXILIARY POWER SUPPLY DEVICE

INCORPORATION BY REFERENCE

The disclosure of Japanese Patent Application No. 2013-018359 filed on Feb. 1, 2013, including the specification, drawings and abstract, is incorporated herein by reference in its entirety.

BACKGROUND OF THE INVENTION

1. Field of the Invention

The invention relates to an auxiliary power supply device including an auxiliary power source and an electric power steering system including the auxiliary power supply device.

2. Description of the Related Art

A conventional electric power steering system includes an auxiliary power source that is connected to a main power source, and a booster circuit that boosts a voltage of the main power source. In the electric power steering system, a boosted voltage of the booster circuit is applied to the auxiliary power source when the auxiliary power source is charged with the use of the main power source. Japanese Patent Application Publication No. 2009-166679 (JP 2009-166679 A) describes an example of a configuration of the conventional electric power steering system.

In the conventional electric power steering system, the relationship between the boosted voltage of the booster circuit and the voltage across terminals of a capacitor at the time of starting the charging of the auxiliary power source is not particularly considered in controlling the booster circuit. Accordingly, when the voltage across the terminals of the capacitor at the time of starting the charging of the auxiliary power source is higher than the boosted voltage of the booster circuit, an electric current may flow back from the capacitor to the booster circuit.

SUMMARY OF THE INVENTION

An object of the invention is to provide an auxiliary power supply device that makes it possible to appropriately supply an electric current from a main power source to an auxiliary power source at the time of starting the charging of the auxiliary power source, and an electric power steering system.

An auxiliary power supply device according to an aspect of the invention includes an auxiliary power source that is connected to a main power source, and that is able to discharge an electric current to an electric motor, the main power source supplying electric power to the electric motor; and a booster circuit that boosts a voltage of the main power source and applies the boosted voltage to the auxiliary power source. When supply of the electric power from the main power source to the auxiliary power source is started in a state where a voltage across terminals of the auxiliary power source is higher than the voltage of the main power source, the voltage applied to the auxiliary power source by the booster circuit increases with an increase in the voltage across the terminals of the auxiliary power source.

In the auxiliary power supply device according to the above-described aspect, it is possible to decrease a voltage difference between the voltage across the terminals of the auxiliary power source and the voltage applied to the auxiliary power source by the booster circuit when the supply of the electric power from the main power source to the auxiliary power source is started. Accordingly, when the supply of the electric power from the main power source to the auxiliary power source is started, a backflow of an electric current from the auxiliary power source to the main power source is prevented. Therefore, when the supply of the electric power from the main power source to the auxiliary power source is started, it is possible to appropriately supply the electric current from the main power source to the auxiliary power source.

An electric power steering system according to an aspect of the invention includes an electric motor that generates an assist torque based on a steering torque; the auxiliary power supply device according to the above-described aspect; and a control device that controls an operation of the auxiliary power supply device.

In the electric power steering system according to the above-described aspect, the control device may be configured to supply a first reference current from the main power source to the auxiliary power source when a traveling speed of a vehicle is equal to or lower than a vehicle speed threshold value, and to supply a second reference current from the main power source to the auxiliary power source when the traveling speed of the vehicle is higher than the vehicle speed threshold value, the second reference current being smaller than the first reference current.

When steering is assisted by the electric power steering system, it is preferable that the assist torque should increase with a decrease in the traveling speed of the vehicle. It is preferable that the assist torque when the traveling speed of the vehicle is equal to or lower than the vehicle speed threshold value should be larger than the assist torque when the traveling speed of the vehicle is higher than the vehicle speed threshold value. Accordingly, power consumption of the electric motor when the traveling speed of the vehicle is equal to or lower than the vehicle speed threshold value is larger than the power consumption of the electric motor when the traveling speed of the vehicle is higher than the vehicle speed threshold value.

When the power consumption of the electric motor is large, it is preferable, from the viewpoint of reducing the load of the main power source, that the auxiliary power source should discharge the electric current to the electric motor. Accordingly, when the power consumption of the electric motor is large, it is preferable that the auxiliary power source should have a sufficient amount of stored electricity. Therefore, when the power consumption of the electric motor is large and the auxiliary power source does not have a sufficient amount of stored electricity, it is preferable that the auxiliary power source should be rapidly charged.

When the power consumption of the electric motor is small, it is not necessary to discharge the electric current from the auxiliary power source to the electric motor. Accordingly, when the power consumption of the electric motor is small and the auxiliary power source does not have a sufficient amount of stored electricity, it is not necessary to rapidly charge the auxiliary power source.

Thus, in the electric power steering system according to the above-described aspect, the first reference current is supplied to the auxiliary power source when the traveling speed of the vehicle is equal to or lower than the vehicle speed threshold value, and the second reference current smaller than the first reference current is supplied to the auxiliary power source when the traveling speed of the vehicle is higher than the vehicle speed threshold value. Accordingly, when the power consumption of the electric motor is large, the auxiliary power source is charged more rapidly than when the power consumption of the electric motor is small.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
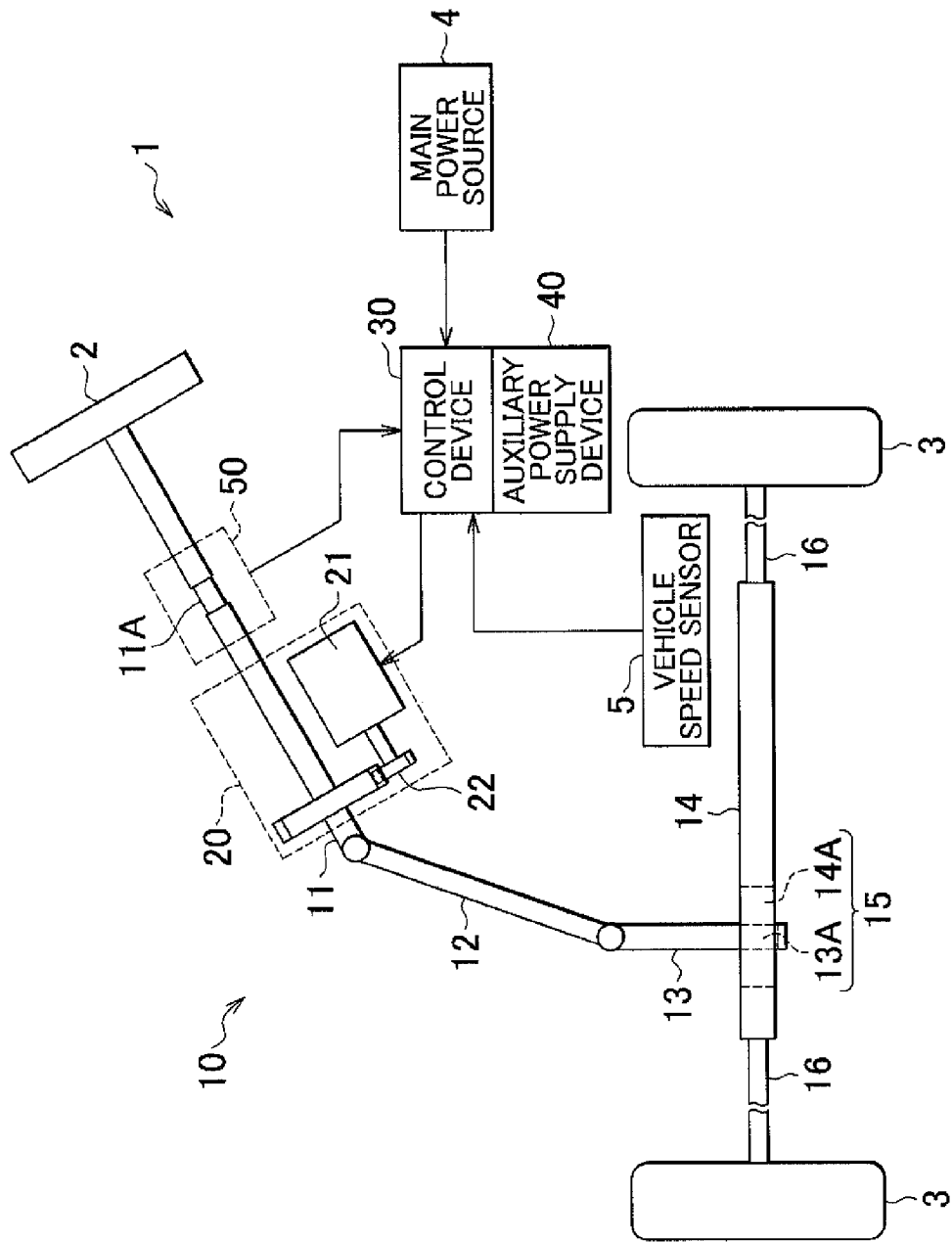
FIG. 1 is a configuration diagram showing a configuration of an electric power steering system according to a first embodiment.

Hereinafter, a first embodiment of the invention will be described with reference to the accompanying drawings. A configuration of an electric power steering system (hereinafter referred to as "EPS 1") will be described with reference to FIG. 1.

The EPS 1 includes an EPS body 10, an assist device 20, a control device 30, an auxiliary power supply device 40, and a torque sensor 50. In the EPS 1, a main power source 4 and a vehicle speed sensor 5 are electrically connected to the control device 30. The EPS 1 has a configuration in which electric power is supplied to the assist device 20 via the control device 30 from a battery that is the main power source 4 and the auxiliary power supply device 40. In the EPS 1, an operation of a steering component 2 is assisted with the use of the assist device 20. For example, a steering wheel is used as the steering component 2.

The EPS body 10 includes a column shaft 11, an intermediate shaft 12, a pinion shaft 13, a rack shaft 14, a rack and pinion mechanism 15, and two tie rods 16. In the EPS body 10, the column shaft 11, the intermediate shaft 12, and the pinion shaft 13 rotate together due to the rotation of the steering component 2. In the EPS body 10, the rack shaft 14 is reciprocated due to the rotation of the pinion shaft 13, and thus, a steered angle of vehicle wheels 3 is changed.

The rack and pinion mechanism 15 has a configuration in which a pinion gear 13A of the pinion shaft 13 and a rack gear 14A of the rack shaft 14 engage with each other. In the rack and pinion mechanism 15, the rotation of the pinion shaft 13 is converted to reciprocating motion of the rack shaft 14 with the use of engagement of the pinion gear 13A and the rack gear 14A.

The assist device 20 includes an electric motor 21 that is a three-phase brushless motor and a speed reducing mechanism 22 including a worm gear. In the assist device 20, the rotation of the electric motor 21 is transmitted to the column shaft 11 via the speed reducing mechanism 22 so as to apply a force for rotating the column shaft 11 (hereinafter, referred to as "assist torque TA") to the column shaft 11. Thus, the EPS 1 has a column assist type structure.

The torque sensor 50 transmits a torque signal to the control device 30 via an in-vehicle communication network. The vehicle speed sensor 5 transmits a vehicle speed signal to the control device 30 via the in-vehicle communication network.

The control device 30 calculates the magnitude and the direction of a torsion of a torsion bar 11A connected to an intermediate portion of the column shaft 11, that is, a torque (hereinafter referred to as "steering torque t") applied to the column shaft 11 due to the operation of the steering component 2, on the basis of the torque signal of the torque sensor 50. The control device 30 calculates a traveling speed of a vehicle (hereinafter referred to as "vehicle speed VS") on the basis of the vehicle speed signal of the vehicle speed sensor 5. The control device 30 performs assist control of assisting a steering operation by controlling the operation of the electric motor 21, and performs power supply control of controlling the electric power of the main power source 4 and the electric power of the auxiliary power supply device 40 by controlling the operation of the auxiliary power supply device 40.

Figure 2:
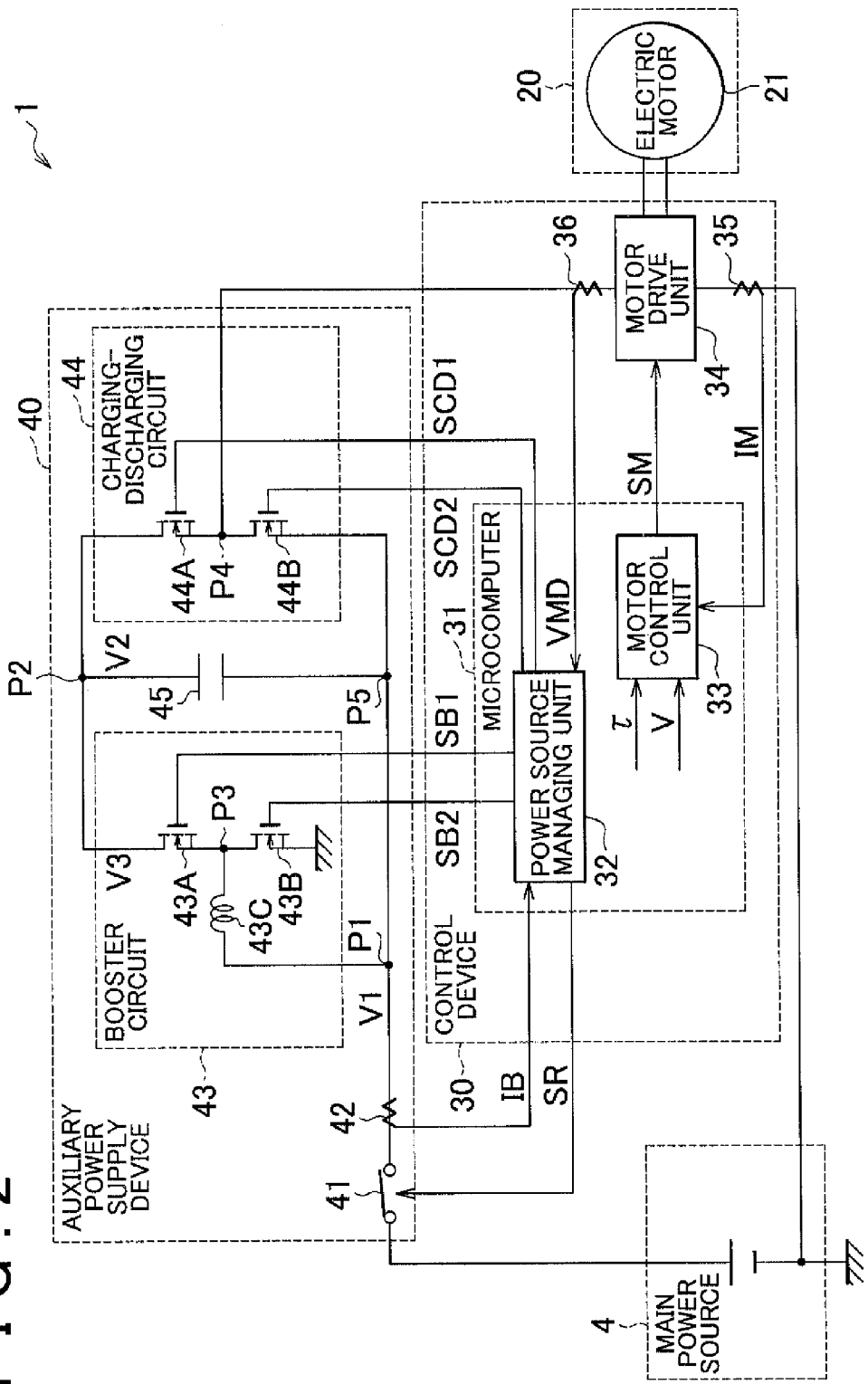
FIG. 2 is a circuit diagram showing a configuration of a circuit in the electric power steering system according to the first embodiment.

The configurations of the control device 30 and the auxiliary power supply device 40 will be described below with reference to FIG. 2. The control device 30 includes a microcomputer 31, a motor drive circuit 34, a current sensor 35, and a voltage sensor 36. The control device 30 controls a voltage (hereinafter referred to as "motor drive voltage VMD") applied to the motor drive circuit 34.

The current sensor 35 transmits a signal corresponding to the magnitude of an actual current (hereinafter referred to as "motor current IM") supplied to the electric motor 21 to a motor control unit 33 of the microcomputer 31. The voltage sensor 36 transmits a signal corresponding to a voltage between the auxiliary power supply device 40 and the motor drive circuit 34, that is, the motor drive voltage VMD, to a power source managing unit 32 of the microcomputer 31.

The microcomputer 31 includes the power source managing unit 32 and the motor control unit 33. The power source managing unit 32 of the microcomputer 31 controls charging and discharging operations of the auxiliary power supply device 40. The motor control unit 33 of the microcomputer 31 controls the operation of the motor drive circuit 34.

The power source managing unit 32 controls the operations of a relay 41, a booster circuit 43, and a charging-discharging circuit 44 of the auxiliary power supply device 40. The power source managing unit 32 outputs a relay signal SR for controlling the operation of the relay 41 to the relay 41. The power source managing unit 32 outputs boost signals SB1 and SB2 for controlling the operation of the booster circuit 43 to the booster circuit 43. The power source managing unit 32 outputs charging-discharging signals SCD1 and SCD2 for controlling the operation of the charging-discharging circuit 44 to the charging-discharging circuit 44.

The motor control unit 33 generates a motor control signal SM for performing the assist control. Specifically, the motor control unit 33 calculates a target assist torque on the basis of the steering torque τ and the vehicle speed VS. The motor control unit 33 generates a motor control signal SM by performing current feedback control so as to match the motor current IM with the a current command value corresponding to the target assist torque. The motor control unit 33 outputs the motor control signal SM to the motor drive circuit 34. The target assist torque increases with an increase in the absolute value of the steering torque τ and increases with a decrease in the absolute value of the vehicle speed VS.

The motor drive circuit 34 has a known configuration in which two switching elements (metal-oxide-semiconductor field-effect transistors (MOSFETs)) are connected in series for each phase of the electric motor 21. In the motor drive circuit 34, each of the two switching elements for each phase in the motor drive circuit 34 is alternately switched between an ON state and an OFF state, on the basis of the motor control signal SM of the motor control unit 33. In the motor drive circuit 34, the state of each of the switching elements is switched between the ON and OFF states, so as to apply the motor drive voltage VMD as a PWM drive voltage to the electric motor 21.

The auxiliary power supply device 40 is formed independently of the main power source 4. The auxiliary power supply device 40 is connected in series to the main power source 4. The auxiliary power supply device 40 includes the relay 41, the current sensor 42, the booster circuit 43, the charging-discharging circuit 44, and the capacitor 45 as an auxiliary power source. The auxiliary power supply device 40 discharges an electric current from the capacitor 45 to the electric motor 21 via the control device 30.

The relay 41 is disposed between the main power source 4 and the booster circuit 43. The relay 41 is switched between an ON state where electric power is supplied to the motor drive circuit 34 by the main power source 4 and an OFF state where electric power is not supplied to the motor drive circuit 34 by the main power source 4.

The current sensor 42 is disposed between the relay 41 and the booster circuit 43. The current sensor 42 outputs a signal corresponding to the magnitude of an output current of the main power source 4 (hereinafter referred to as "battery current IB"), to the power source managing unit 32.

The booster circuit 43 boosts an output voltage based on the voltage of the main power source 4, that is, an output voltage (hereinafter referred to as "output voltage V1") at a connecting point P1 between the main power source 4 and the auxiliary power supply device 40, and applies the boosted voltage to a connecting point P2 that is an output terminal of the capacitor 45. Thus, the capacitor 45 can be charged.

The booster circuit 43 includes a pair of switching elements 43A and 43B and a booster coil 43C. The booster circuit 43 has a configuration in which one end of the booster coil 43C is connected to a connecting point P3 between the switching elements 43A and 43B connected in series to each other. In the booster circuit 43, the output voltage V1 is applied to the other end of the booster coil 43C.

As each of the switching elements 43A and 43B, a MOSFET is used. One end of the upper-stage switching element 43A is connected to the output terminal of the capacitor 45 (connecting point P2). The other end of the switching element 43A is connected to the lower-stage switching element 43B. One end of the lower-stage switching element 43B is grounded. The switching elements 43A and 43B are switched between an ON state and an OFF state, on the basis of the boost signals SB1 and SB2 of the power source managing unit 32, respectively.

The switching elements 43A and 43B are controlled by the power source managing unit 32 so that switching elements 43A and 43B are not simultaneously in the ON state. When the switching element 43A is in the ON state, electric power can be supplied from the booster coil 43C to the capacitor 45. When the switching element 43A is in the OFF state, electric power cannot be supplied from the booster coil 43C to the capacitor 45. When the switching element 43B is in the ON state, the booster coil 43C is grounded. When the switching element 43B is in the OFF state, the booster coil 43C is not grounded.

The charging-discharging circuit 44 is connected in series to the booster circuit 43. The charging-discharging circuit 44 has a configuration in which paired switching elements 44A and 44B are connected in series to each other. The charging-discharging circuit 44 is connected to the motor drive circuit 34 at a connecting point P4 between the switching elements 44A and 44B.

As each of the switching elements 44A and 44B, a MOSFET is used. One end of the upper-stage switching element 44A is connected to the output terminal of the capacitor 45 (connecting point P2). The other end of the switching element 44A is connected to the lower-stage switching element 44B. One end of the lower-stage switching element 44B is electrically connected to the main power source 4 via the current sensor 42 and the relay 41.

The switching elements 44A and 44B are periodically switched between an ON state as a conduction state and an OFF state as a non-conduction state, on the basis of the charging-discharging signals SCD1 and SCD2 of the power source managing unit 32, respectively. When the switching element 44A is in the ON state, an electric current can be discharged from the capacitor 45 to the motor drive circuit 34 (electric motor 21). When the switching element 44A is in the OFF state, an electric current cannot be discharged from the capacitor 45 to the motor drive circuit 34 (electric motor 21). When the switching element 44B is in the ON state, electric power can be supplied from the main power source 4 to the motor drive circuit 34 (electric motor 21) via the switching element 44B. When the switching element 44B is in the OFF state, electric power cannot be supplied from the main power source 4 to the motor drive circuit 34 (electric motor 21) via the switching element 44B.

The capacitor 45 between the booster circuit 43 and the charging-discharging circuit 44 is connected in parallel to the booster circuit 43 and the charging-discharging circuit 44. One end of the capacitor 45 is connected to the connecting point P2. The other end of the capacitor 45 is connected to a connecting point P5 between the current sensor 42 and the switching element 44B. An electric double layer capacitor is used as the capacitor 45.

The capacitor 45 is electrically connected to the microcomputer 31. The voltage across terminals of the capacitor 45 (hereinafter referred to as "capacitor voltage V2") is measured using A/D conversion in the microcomputer 31. The capacitor voltage V2 is constantly monitored by the microcomputer 31.

The operation of the booster circuit 43 will be described below. The booster circuit 43 applies a boosted voltage V3, which is generated by switching the lower-stage switching element 43B from the ON state to the OFF state, to the output terminal of the capacitor 45 (connecting point P2). Specifically, in the booster circuit 43, when the switching element 43B is turned ON, the switching element 43B is brought to the conduction state to ground one end of the booster coil 43C. In the booster circuit 43, an induced voltage, which is generated in the booster coil 43C by switching the switching element 43B from the OFF state to the ON state, is superimposed on the output voltage V1, and thus, the booster circuit 43 outputs the boosted voltage. The upper-stage switching element 43A has a function of preventing an electric current from flowing back (backward flow) from the capacitor 45 to the booster circuit 43.

The operation of the charging-discharging circuit 44 will be described below. The charging-discharging circuit 44 is switched between a first power supply mode in which electric power is supplied from the main power source 4 to the motor drive circuit 34 and a second power supply mode in which electric power is supplied from the main power source 4 and the capacitor 45 to the motor drive circuit 34, on the basis of combinations of the ON state and the OFF state of the switching elements 44A and 44B. The switching elements 44A and 44B are controlled by the power source managing unit 32 so that the switching elements 44A and 44B are not simultaneously in the ON state.

In the first power supply mode, the upper-stage switching element 44A is in the OFF state and the lower-stage switching element 44B is in the ON state. In the first power supply mode, the battery current IB of the main power source 4 is supplied to the capacitor 45 and is supplied to the motor drive circuit 34 via the lower-stage switching element 44B. In the first power supply mode, since the upper-stage switching element 44A is in the OFF state, an electric current is not discharged from the capacitor 45 to the motor drive circuit 34.

In the second power supply mode, the upper-stage switching element 44A is in the ON state and the lower-stage switching element 44B is in the OFF state. In the second power supply mode, the main power source 4 and the capacitor 45 are connected in series to each other. In the second power supply mode, the capacitor 45 discharges an electric current to the motor drive circuit 34 in addition to the supply of electric power to the motor drive circuit 34 by the main power source 4.

In the second power supply mode, a value other than 0% and 100% may be also used as a duty ratio that is the ratio of the ON state in one cycle of the switching element 44A and a duty ratio that is the ratio of the ON state in one cycle of the switching element 44B. The motor drive voltage VMD is changed by changing the duty ratios of the switching elements 44A and 44B. Specifically, the motor drive voltage VMD increases with an increase in the duty ratio of the switching element 44A. When the duty ratio of the switching element 44A is 100%, the motor drive voltage VMD is the maximum value. When the duty ratio of the switching element 44A is 50%, the motor drive voltage VMD is a half of the maximum value. The duty ratio of the switching element 44B decreases with an increase in the duty ratio of the switching element 44A.

Details of the power supply control will be described below with reference to FIGS. 3 and 4. In the following description with reference to FIGS. 3 and 4, the elements of the EPS 1, to which reference numerals are assigned, are the same as the elements shown in FIG. 1 or FIG. 2.

Source power PS represents actual electric power supplied from the main power source 4 to the auxiliary power supply device 40 through the assist control for the EPS 1. The source power PS is calculated on the basis of the battery current IB. A charging-discharging threshold value KE represents a reference value for switching between charging of the capacitor 45 by the main power source 4 and discharging from the capacitor 45 to the motor drive circuit 34 (electric motor 21). The charging-discharging threshold value KE is set in advance by experiments or the like.

Figure 3:
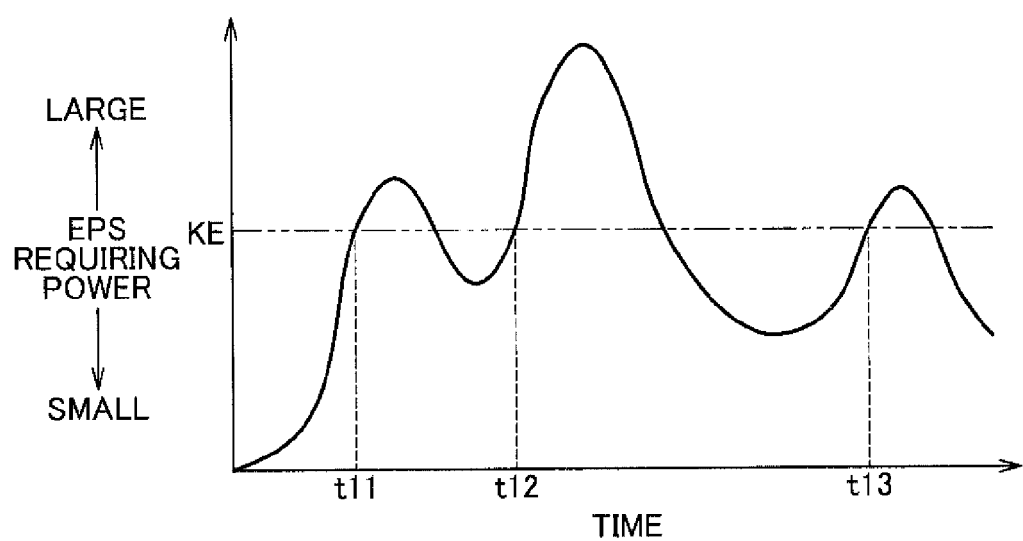
FIG. 3 is a graph relating to the electric power steering system according to the first embodiment, the graph showing a variation of EPS requiring power.

In FIG. 3, the entire period is divided into periods in which electric power required of the main power source 4 due to the assist control of the EPS 1 (hereinafter referred to as "EPS requiring power") is equal to or larger than the charging-discharging threshold value KE (hereinafter each of these periods will be referred to as "discharging period"), and periods in which the EPS requiring power is smaller than the charging-discharging threshold value KE.

The source power PS is smaller than the charging-discharging threshold value KE in each period in which the EPS requiring power is smaller than the charging-discharging threshold value KE. The source power PS is equal to or larger than the charging-discharging threshold value KE in each discharging period. The source power PS is larger than the charging-discharging threshold value KE, for example, in each of periods from t11, t12, and t13 until the charging-discharging circuit 44 is switched from the first power supply mode to the second power supply mode. Cases where the source power PS is equal to or larger than the charging-discharging threshold value KE include a case where a driver performs a steering operation on the steering component 2 without driving a vehicle at the time of placing the vehicle into a garage or parking the vehicle.

In the power supply control, the operation of the capacitor 45 is controlled on the basis of comparison between the source power PS and the charging-discharging threshold value KE. The capacitor 45 discharges an electric current to the motor drive circuit 34 in the discharging period. The capacitor 45 is charged with the use of the main power source 4 in the period in which the source power PS is smaller than the charging-discharging threshold value KE and the capacitor 45 is not fully charged (hereinafter, this period will be referred to as "charging period").

Figure 4:
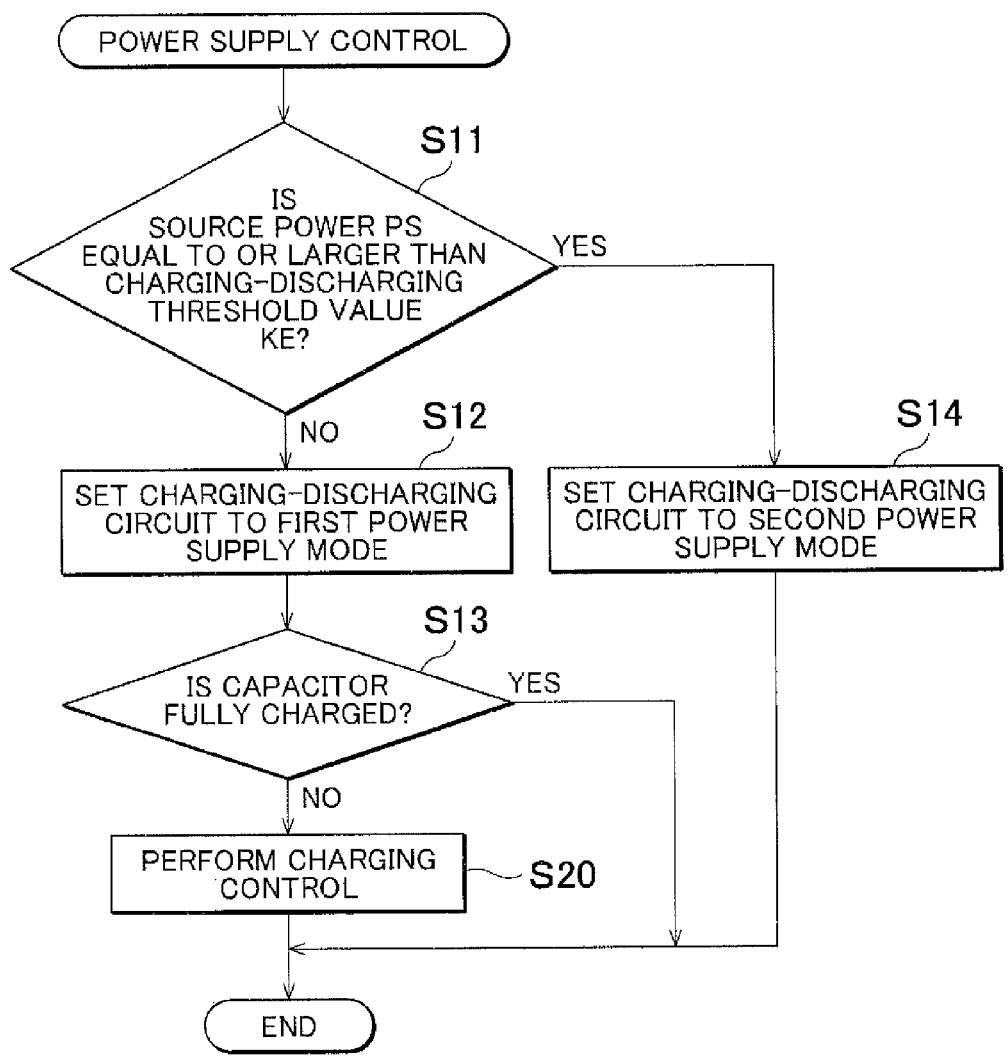
FIG. 4 is a flowchart showing a procedure of processing of power supply control performed by a control device of the electric power steering system according to the first embodiment.

In the power supply control, the processing shown in FIG. 4 is repeatedly performed at every predetermined time. In step S11, the control device 30 determines whether the source power PS is equal to or larger than the charging-discharging threshold value KE. When an affirmative determination is made in step S11, the control device 30 sets the charging-discharging circuit 44 to the second power supply mode in step S14. Accordingly, in order to supply the EPS requiring power, in addition to supplying the source power PS, the amount by which the EPS requiring power exceeds the charging-discharging threshold value KE is supplied by the discharging of the capacitor 45. When the source power PS is equal to or larger than the charging-discharging threshold value KE, the source power PS (battery current IB) is decreased to the charging-discharging threshold value KE through the discharging control. Accordingly, the load of the main power source 4 is decreased.

When a negative determination is made in step S11, the control device 30 sets the charging-discharging circuit 44 to the first power supply mode in step S12. Accordingly, the EPS requiring power is supplied by supplying the source power PS.

In step S13, the control device 30 determines whether the capacitor 45 is fully charged. When an affirmative determination is made in step S13, the control device 30 determines that it is not necessary to charge the capacitor 45. Then, the control device 30 ends the processing. On the other hand, when a negative determination is made in step S13, the control device 30 determines that it is necessary to charge the capacitor 45. Then, the control device 30 performs the charging control for charging the capacitor 45 in step S20. The control device 30 fully charges the capacitor 45 through the use of the charging control. Thus, the control device 30 switches the mode of the operation of the auxiliary power supply device 40 among a mode in which the capacitor 45 is charged, a mode in which the capacitor 45 is not charged, and a mode in which the capacitor 45 discharges an electric current to the motor drive circuit 34, through the use of the power supply control.

Details of the charging control will be described below with reference to FIGS. 5 to 8. In the following description with reference to FIGS. 5 to 8, the elements of the EPS 1, to which reference numerals are assigned, are the same as the elements shown in FIG. 1 or FIG. 2.

Figure 5:
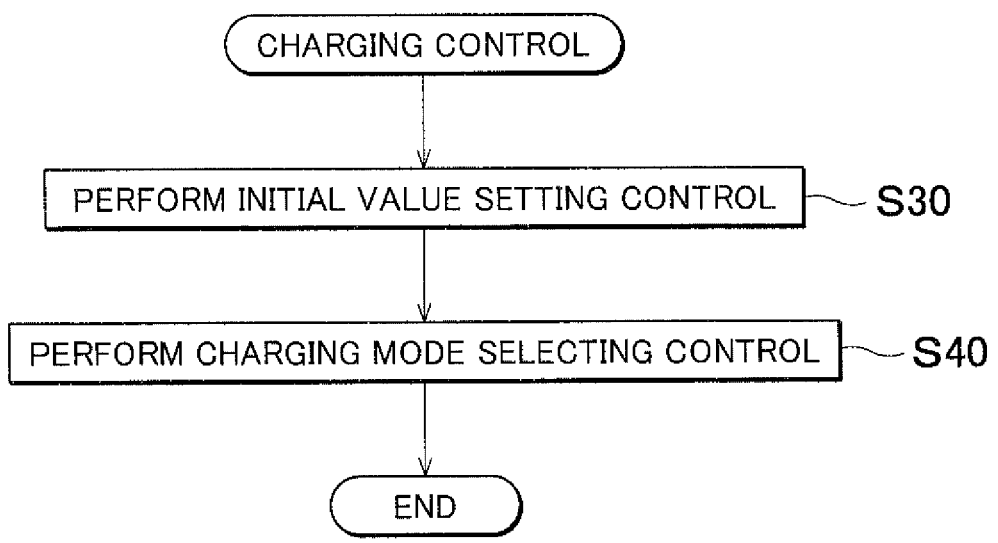
FIG. 5 is a flowchart showing a procedure of processing of charging control performed by the control device of the electric power steering system according to the first embodiment.

As shown in FIG. 5, the charging control includes initial value setting control (step S30) and charging mode selecting control (step S40). In the charging control, the initial value setting control is first performed and then the charging mode selecting control is performed. The charging control is repeatedly performed at every predetermined time. In the initial value setting control of the charging control, the operation of the booster circuit 43 in the initial cycle of the charging control is set. In the charging mode selecting control of the charging control, the charging mode is selected on the basis of the condition of a vehicle.

Details of the initial value setting control will be described below. In the initial value setting control, as the operation of the booster circuit 43, the control device 30 sets the duty ratio that is a ratio of the ON state in one cycle of the switching element 43A and the duty ratio that is a ratio of the ON state in one cycle of the switching element 43B in the initial cycle of the charging control.

Specifically, in the initial value setting control, the control device 30 sets the duty ratios of the switching elements 43A and 43B so that the boosted voltage V3 of the booster circuit 43 is equal to the capacitor voltage V2 in the initial cycle of the charging control. Hereinafter, the duty ratio of the switching element 43B in the initial cycle of the charging control is referred to as an initial duty ratio.

Figure 6:
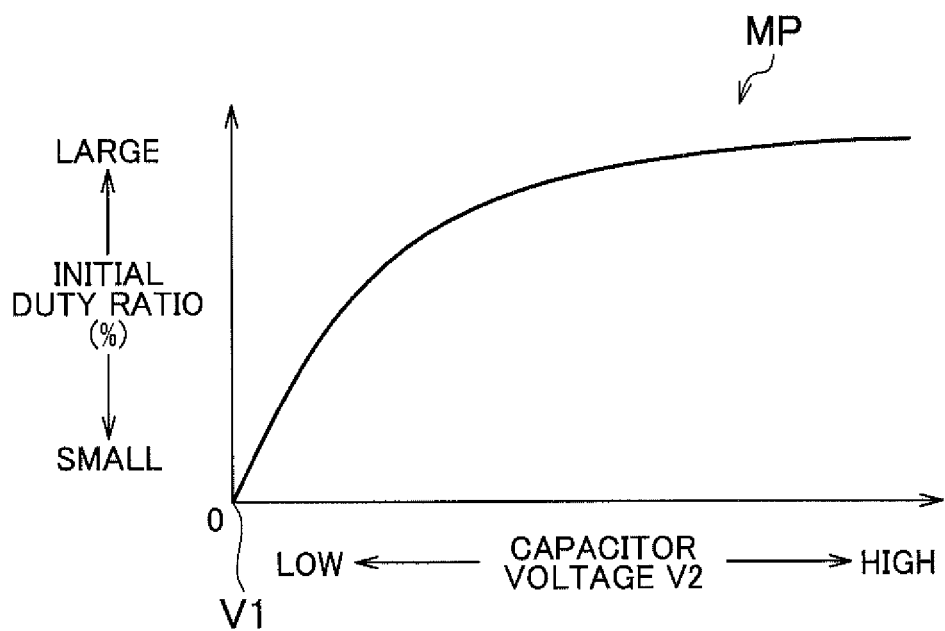
FIG. 6 is a map relating to the electric power steering system according to the first embodiment, the map showing a relationship between a capacitor voltage and an initial duty ratio.

As shown in FIG. 6, a map MP representing the relationship between the capacitor voltage V2 and the initial duty ratio is stored in advance in the control device 30. In the initial cycle of the charging control, the control device 30 acquires the capacitor voltage V2 and calculates the initial duty ratio corresponding to the capacitor voltage V2 on the basis of the map MP.

Details of the map MP will be described below. In the map MP, the initial duty ratio is set to 0% when the capacitor voltage V2 in the initial cycle of the charging control is equal to or lower than the output voltage V1. In the map MP, the initial duty ratio is set to increase with an increase in the capacitor voltage V2 when the capacitor voltage V2 in the initial cycle of the charging control is higher than the output voltage V1. In the map MP, the initial duty ratio is set to match the boosted voltage V3 of the booster circuit 43 with the capacitor voltage V2 when the capacitor voltage V2 in the initial cycle of the charging control is equal to or higher than the output voltage V1.

Figure 7:
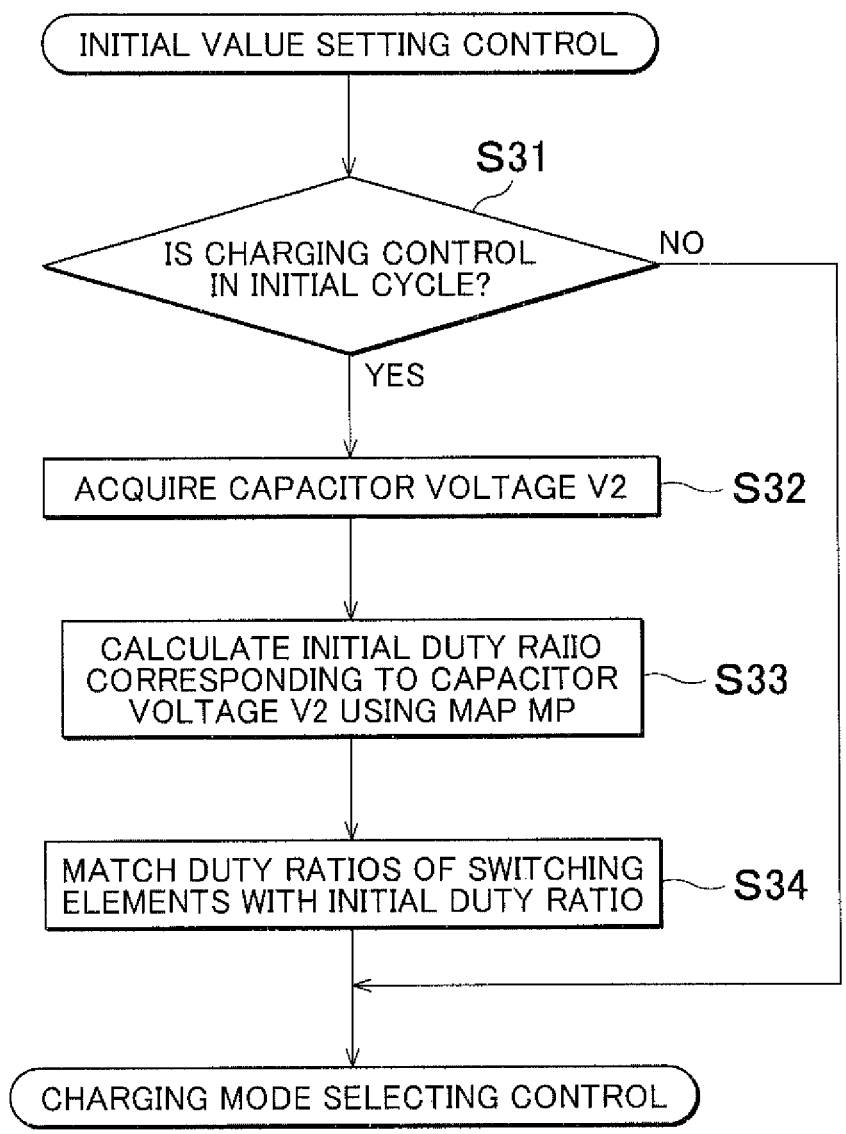
FIG. 7 is a flowchart showing a procedure of processing of initial value setting control performed by the control device of the electric power steering system according to the first embodiment.

In the initial value setting control, the processing shown in FIG. 7 is performed. That is, the control device 30 determines whether the charging control is in an initial cycle in step S31. The determination in step S31 is performed on the basis of a flag F. Specifically, when the charging control in step S20 is performed in the processing of the power supply control shown in FIG. 4, that is, when a negative determination is made in step S13, the flag F is set to 1. Then, when the initial cycle elapses in the processing of the charging control, the flag F is changed to 0. The flag F is maintained at 0 in the period in which the charging control is performed after the flag is changed to 0. Then, the flag F is brought to a state in which the flag F can be changed to 1, when the charging control ends. When the flag F is 1, the control device 30 determines that the charging control is in the initial cycle. On the other hand, when the flag F is 0, the control device 30 determines that the charging control is not in the initial cycle.

When a positive determination is made in step S31, the control device 30 acquires the capacitor voltage V2 in step S32. In step S33, the control device 30 calculates the initial duty ratio corresponding to the capacitor voltage V2 using the map MP. In step S34, the control device 30 controls the operations of the switching elements 43A and 43B so that the duty ratios of the switching elements 43A and 43B of the booster circuit 43 are matched with the initial duty ratio.

Details of the charging mode selecting control will be described below. The control device 30 performs constant-current charging in the charging control. The control device 30 has a rapid charging mode and a normal charging mode as the charging mode. In the rapid charging mode, the control device 30 sets an electric current (hereinafter referred to as "charging current IC") to be supplied from the main power source 4 to the capacitor 45, to a first reference current ICK1. In the normal charging mode, the control device 30 sets the charging current IC to a second reference current ICK2 smaller than the first reference current ICK1. Accordingly, in the rapid charging mode, the capacitor 45 is fully charged within a shorter time shorter than in the normal charging mode.

The control device 30 determines a condition of a vehicle, in other words, the control device 30 determines whether the vehicle is in a condition in which the vehicle is stopped or the vehicle speed VS is very low, or in a condition in which the vehicle speed VS is higher than the very low speed, that is, a condition in which the vehicle normally travels. Then, the control device 30 switches the charging mode between the rapid charging mode and the normal charging mode, depending on the condition of the vehicle.

Figure 8:
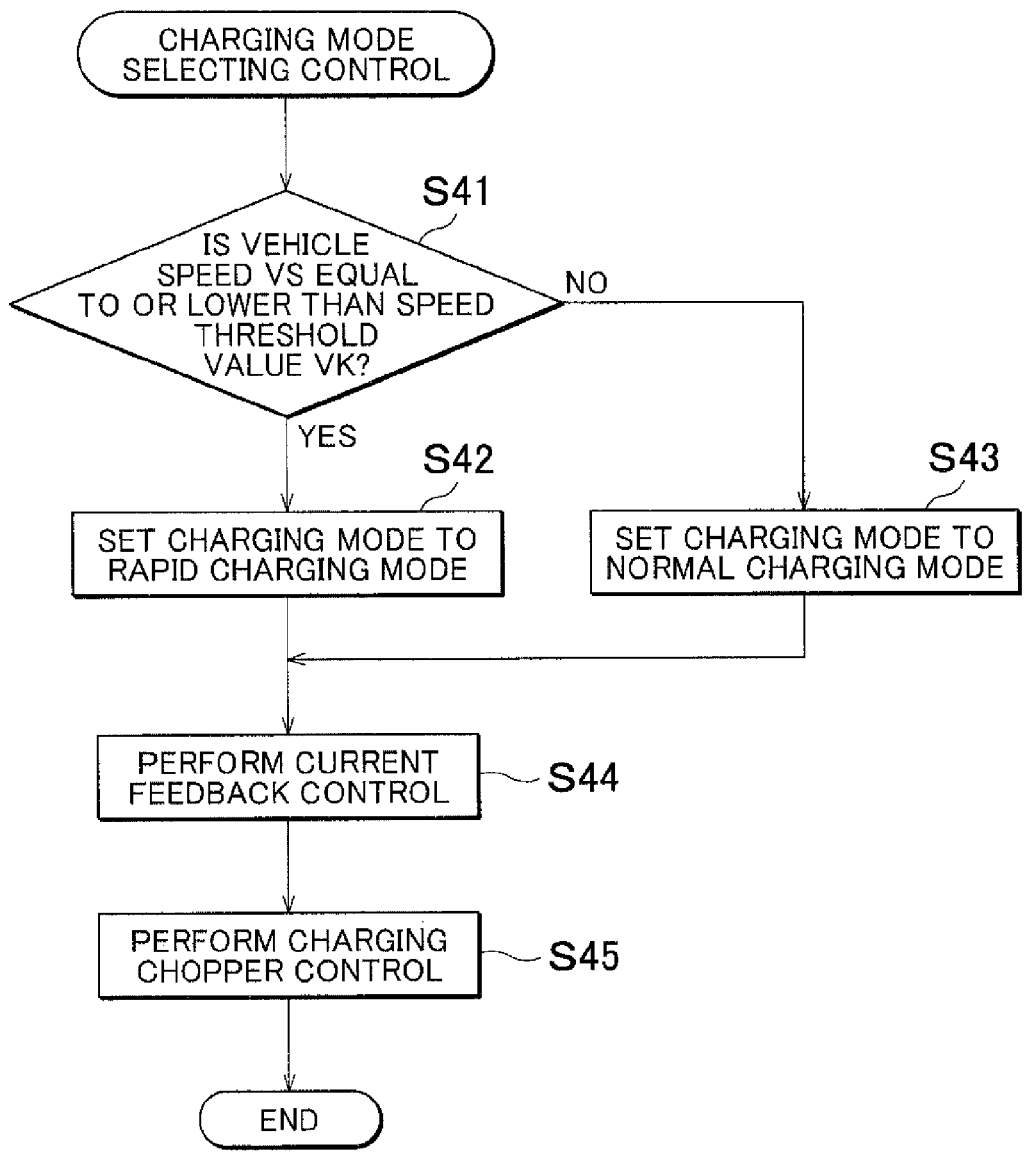
FIG. 8 is a flowchart showing a procedure of processing of charging mode selecting control performed by the control device in the electric power steering system according to the first embodiment.

In the charging mode selecting control, the processing shown in FIG. 8 is performed. That is, in step S41, the control device 30 determines whether the vehicle speed VS is equal to or lower than a vehicle speed threshold value VK. The vehicle speed threshold value VK corresponds to the upper limit in a vehicle speed range in which each value of the vehicle speed V is determined to be a very slow speed. The vehicle speed threshold value VK is set in advance by experiments or the like.

When an affirmative determination is made in step S41, that is, when it is determined that the vehicle is stopped or the vehicle speed VS is the very low speed, the control device 30 sets the charging mode to the rapid charging mode in step S42. On the other hand, when a negative determination is made in step S41, that is, when it is determined that the vehicle normally travels, the control device 30 sets the charging mode to the normal charging mode in step S43.

The control device 30 performs current feedback control in step S44 on the basis of the charging mode set in step S42 or step S43. Then, the control device 30 performs charging chopper control in step S45.

Specifically, the control device 30 calculates an actual charging current ICR by subtracting the current supplied to the motor drive circuit 34 from the battery current TB. When the charging mode is set to the rapid charging mode, the control device 30 performs PID control based on a difference between the first reference current ICK1 and the actual charging current ICR. Accordingly, the control device 30 sets a target charging current ICG so as to match the actual charging current ICR with the first reference current ICK1. Then, the control device 30 calculates the duty ratios of the switching elements 43A and 43B of the booster circuit 43 on the basis of the target charging current ICG. On the other hand, when the charging mode is set to the normal charging mode, the control device 30 performs the PID control based on the difference between the second reference current ICK2 and the actual charging current ICR. Accordingly, the control device 30 sets the target charging current ICG so as to match the actual charging current ICR with the second reference current ICK2. Then, the control device 30 calculates the duty ratios of the switching elements 43A and 43B of the booster circuit 43 on the basis of the target charging current ICG.

The control device 30 controls the operations of the switching elements 43A and 43B on the basis of the duty ratios of the switching elements 43A and 43B of the booster circuit 43 calculated in step S42 or step S43, as the charging chopper control.

The operation of the EPS 1 according to this embodiment will be described below. In the following description, the elements of the EPS 1, to which reference numerals are assigned, are the same as the elements shown in FIGS. 1 and 2. The EPS 1 has the following first to third functions. The first function is a function of preventing a backflow of an electric current from the capacitor 45 to the booster circuit 43 at the time of starting the charging of the capacitor 45. The second function is a function of preventing a large electric current from flowing from the main power source 4 to the booster circuit 43 at the time of starting the charging of the capacitor 45. The third function is a function of changing the magnitude of the charging current IC depending on the condition of the vehicle.

The first function will be described below in detail. A first virtual EPS performs control of setting the duty ratio of the switching element 43B of the booster circuit 43 in the initial cycle of the charging control to 0%.

In the first virtual EPS, the boosted voltage V3 of the booster circuit 43 in the initial cycle of the charging control is equal to the output voltage V1. Accordingly, when the capacitor voltage V2 is higher than the boosted voltage V3, an electric current flows back from the capacitor 45 to the booster circuit 43.

In the EPS 1 according to this embodiment, when the capacitor voltage V2 is equal to or higher than the output voltage V1 in the initial cycle of the charging control, as the capacitor voltage V2 increases, the initial duty ratio is increased by the initial value setting control. Accordingly, the voltage difference between the capacitor voltage V2 and the boosted voltage V3 of the booster circuit 43 decreases in the initial cycle of the charging control. Particularly, in the EPS 1 according to this embodiment, the capacitor voltage V2 is equal to the boosted voltage V3 of the booster circuit 43 in the initial cycle of the charging control. Accordingly, a backflow of an electric current from the capacitor 45 to the booster circuit 43 is prevented.

The second function will be described below in detail. A second virtual EPS performs control of setting the duty ratio of the switching element 43B of the booster circuit 43 in the initial cycle of the charging control to 50%.

In the second virtual EPS, the boosted voltage V3 of the booster circuit 43 is a maximum value in the initial cycle of the charging control. Accordingly, when the capacitor voltage V2 is equal to or lower than the output voltage V1, the voltage difference between the boosted voltage V3 and the capacitor voltage V2 increases. Accordingly, a large electric current flows from the main power source 4 to the booster circuit 43.

In the EPS 1 according to this embodiment, when the capacitor voltage V2 is equal to or lower than the output voltage V1 in the initial cycle of the charging control, the initial duty ratio is set to 0% by the initial value setting control. Accordingly, the voltage difference between the boosted voltage V3 and the capacitor voltage V2 in the initial cycle of the charging control is smaller than that in the second virtual EPS. Accordingly, a large electric current is prevented from flowing from the main power source 4 to the booster circuit 43.

The third function will be described below in detail. When the vehicle is stopped or the vehicle speed VS is very low, the power consumption of the electric motor 21 due to the steering operation is large. On the other hand, when the vehicle speed VS is high, the power consumption of the electric motor 21 due to the steering operation is small. Accordingly, when the vehicle is stopped or the vehicle speed VS is very low, the possibility that an electric current is discharged from the capacitor 45 to the motor drive circuit 34 is high. On the other hand, the vehicle speed VS is high, the possibility that an electric current is discharged from the capacitor 45 is low.

Accordingly, when the vehicle is stopped or the vehicle speed VS is very low, it is preferable that the capacitor 45 should have a sufficient amount of stored electricity. When the vehicle is stopped or the vehicle speed VS is very low and the amount of electricity stored in the capacitor 45 is small, it is preferable that the capacitor 45 should be rapidly charged.

On the other hand, when the vehicle speed VS is high, the capacitor 45 does not need to have a sufficient amount of stored electricity. Accordingly, when the vehicle speed VS is high and the amount of electricity stored in the capacitor 45 is small, it is not necessary to rapidly charge the capacitor 45.

When the capacitor 45 is rapidly charged, the charging current IC increases and thus current loss of a harness (not shown) connecting the main power source 4 and the auxiliary power supply device 40 to each other increases. In order to suppress the current loss, it is preferable that the charging current IC should be decreased when it is not necessary to rapidly charge the capacitor 45.

Therefore, in the EPS 1 according to this embodiment, the magnitude of the charging current IC is changed depending on the vehicle speed VS in the charging mode selecting control. Specifically, in the charging mode selecting control, when the vehicle speed VS is equal to or lower than the vehicle speed threshold value VK, the charging current IC is set to the first reference current ICK1. When the vehicle speed VS is higher than the vehicle speed threshold value VK, the charging current IC is set to the second reference current ICK2 smaller than the first reference current ICK1. Accordingly, when the vehicle speed VS is equal to or lower than the vehicle speed threshold value VK, the charging current IC increases and thus the capacitor 45 is rapidly charged. When the vehicle speed VS is higher than the vehicle speed threshold value VK, the charging current IC decreases and thus the current loss is reduced.

The EPS 1 according to this embodiment has the following advantageous effects. The control device 30 performs the initial value setting control in the charging control. With this configuration, when the capacitor voltage V2 is equal to or higher than the output voltage V1 in the initial cycle of the charging control, the boosted voltage V3 of the booster circuit 43 is set to increase with an increase of the capacitor voltage V2. Accordingly, the voltage difference between the capacitor voltage V2 and the boosted voltage V3 decreases. Therefore, a backflow of an electric current from the capacitor 45 to the booster circuit 43 is prevented.

The control device 30 matches the boosted voltage V3 of the booster circuit 43 with the capacitor voltage V2 in the initial value setting control. With this configuration, the voltage difference between the boosted voltage V3 and the capacitor voltage V2 is made "0" in the initial cycle of the charging control. Therefore, the advantageous effect of preventing a backflow of an electric current from the capacitor 45 to the booster circuit 43 is increased.

The control device 30 makes the boosted voltage V3 equal to the output voltage V1, when the capacitor voltage V2 is equal to or lower than the output voltage V1 in the initial value setting control. With this configuration, the voltage difference between the capacitor voltage V2 and the boosted voltage V3 decreases in the initial cycle of the charging control. Therefore, it is possible to prevent a large electric current from flowing from the main power source 4 to the booster circuit 43 due to the voltage difference between the capacitor voltage V2 and the boosted voltage V3.

The control device 30 performs the charging mode selecting control in the charging control. With this configuration, the charging mode is switched between the rapid charging mode and the normal charging mode depending on the condition of the vehicle. Therefore, as compared with a hypothetical configuration in which the capacitor 45 is always charged in the rapid charging mode, the current loss of the harness between the main power source 4 and the auxiliary power supply device 40 is reduced. As compared with a hypothetical configuration in which the capacitor 45 is always charged in the normal charging mode, the capacitor 45 is rapidly charged. Therefore, it is possible to reduce occurrence of a situation in which the capacitor 45 is discharged before the capacitor 45 is sufficiently charged.

Figure 9:
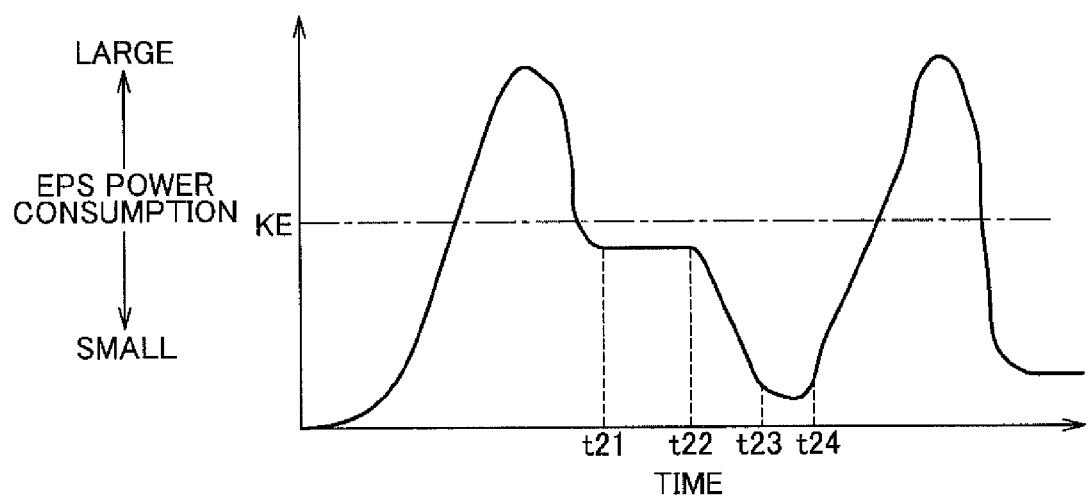
FIG. 9 is a graph relating to an electric power steering system according to a second embodiment, the graph showing a variation of EPS power consumption.
Figure 10:
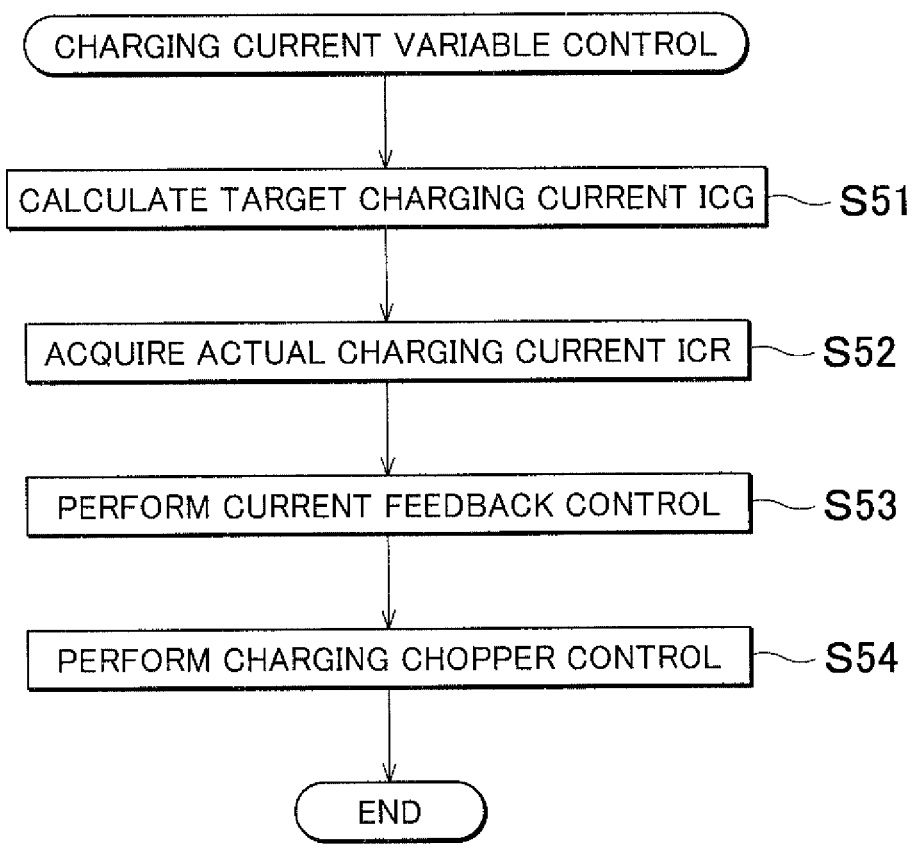
FIG. 10 is a flowchart showing a procedure of processing of charging current variable control performed by a control device according to the second embodiment.

A second embodiment will be described below. FIGS. 9 and 10 are a graph and a flowchart relating to the EPS 1 according to the second embodiment, respectively. The EPS 1 according to the second embodiment has the following main differences from the EPS 1 according to the first embodiment. The charging control includes charging current variable control instead of the charging mode selecting control. Hereinafter, the differences from the EPS 1 according to the first embodiment will be described in detail, the same reference numerals will be assigned to the same elements as those in the first embodiment, and a part or all of description thereof will be omitted.

In the charging control, the initial value setting control is first performed and then the charging current variable control is performed. In the charging current variable control, unlike the constant-current charging, the charging current IC is controlled so as to be variable on the basis of the battery current IB and the charging-discharging threshold value KE.

Details of control of the charging current IC using the charging current variable control will be described below with reference to FIGS. 9 and 10. The graph of FIG. 9 shows a variation of EPS power consumption in a vehicle condition different from the vehicle condition in the graph of FIG. 3.

The EPS power consumption means electric power consumed by the EPS 1 in the assist control. The EPS power consumption is calculated on the basis of the motor drive voltage VMD and the motor current IM. The EPS power consumption corresponds to the power consumption of the electric power steering system.

When the source power PS is equal to or larger than the charging-discharging threshold value KE, the capacitor 45 discharges an electric current. Therefore, it is preferable that the source power PS should be smaller than the charging-discharging threshold value KE at the time of charging the capacitor 45. Accordingly, the maximum value of charged electric power (hereinafter referred to as "chargeable power" in a range in which the source power PS is smaller than the charging-discharging threshold value KE is calculated as a value obtained by subtracting the EPS power consumption from the charging-discharging threshold value KE.

As shown in FIG. 9, for example, the chargeable power in the period from time t23 to time t24 is larger than the chargeable power in the period from time t21 to time t22. Accordingly, the target charging current ICG in the period from time t23 to time t24 is allowed to be larger than the target charging current ICG in the period from time t21 to time t22.

The control device 30 performs the processing shown in FIG. 10 as the charging current variable control. The control device 30 calculates the target charging current ICG in step S51. Specifically, the control device 30 calculates the value obtained by subtracting the EPS power consumption from the charging-discharging threshold value KE as the chargeable power. The control device 30 calculates a value obtained by dividing the chargeable power by the output voltage V1 as the target charging current ICG.

Then, the control device 30 acquires the actual charging current ICR in step S52. Specifically, the control device 30 calculates a value obtained by subtracting the motor current IM from the battery current IB as the actual charging current ICR.

The control device 30 performs the current feedback control in step S53. The control device 30 performs the charging chopper control in step S54. The charging chopper control, which is the same as the charging chopper control in the first embodiment, is performed.

In the current feedback control, the PID control based on the difference between the target charging current ICG and the actual charging current ICR is performed. Accordingly, the duty ratios of the switching elements 43A and 43B of the booster circuit 43 are calculated so as to match the actual charging current ICR with the target charging current ICG.

The operation of the EPS 1 according to this embodiment will be described below with reference to FIG. 9. A third virtual EPS represents a configuration in which the charging control is performed using the constant-current charging. In the third virtual EPS, the chargeable power is not calculated, and thus, for example, in a case where the charging control is performed in the period from time t21 to t22, if the charging current IC is large, the source power PS may become equal to or larger than the charging-discharging threshold value KE due to the charging current IC. Accordingly, in the third virtual EPS, the capacitor 45 is discharged due to the source power PS being equal to or larger than the charging-discharging threshold value KE in the period from time t21 to time t22. Therefore, in the third virtual EPS, the capacitor 45 may not be charged in the period from time t21 to time t22.

In the third virtual EPS, for example, in a case where the charging control is performed in the period from time t23 to time t24, if the charging current IC is small, the capacitor 45 is not rapidly charged and thus the capacitor 45 may not be sufficiently charged at time t24. Accordingly, in the third virtual EPS, when the capacitor 45 is discharged, the amount of electricity stored in the capacitor 45 may be insufficient and thus the electric power supplied by the main power source 4 may not be sufficiently decreased.

On the contrary, in the EPS 1 according to this embodiment, the chargeable power is calculated through the use of the charging current variable control. In the EPS 1, the target charging current ICG is calculated on the basis of the chargeable power. Accordingly, the source power PS is prevented from becoming equal to or larger than the charging-discharging threshold value KE at the time of charging the capacitor 45 in the period from time t21 to time t22. Therefore, it is possible to charge the capacitor 45 in the period from time t21 to time t22. Since the target charging current ICG increases at the time of charging the capacitor 45 in the period from time t23 to time t24, the capacitor 45 is rapidly charged. As a result, it is possible to sufficiently charge the capacitor 45.

The EPS 1 according to this embodiment has the following advantageous effects in addition to the advantageous effects of the EPS 1 according to the first embodiment. In the charging current variable control, the target charging current ICG is calculated on the basis of the EPS power consumption and the charging-discharging threshold value KE. With this configuration, when the chargeable power is low, the source power PS is prevented from becoming larger than the charging-discharging threshold value KE at the time of charging the capacitor 45. When the chargeable power is high, it is possible to sufficiently charge the capacitor 45 at the time of charging the capacitor 45. Therefore, it is possible to appropriately supply the charging current IC to the capacitor 45.

Other embodiments will be described below. The electric power steering system and the auxiliary power supply device according to the invention may be implemented in embodiments other than the above-described embodiments. Hereinafter, modified examples of the above-described embodiments will be described as the other embodiments of the electric power steering system and the auxiliary power supply device according to the invention. The following modified examples may be combined with each other.

The control device 30 according to the first embodiment performs the charging mode selecting control as the charging control. However, the details of the charging control are not limited to those in the first embodiment. For example, the control device 30 according to a modified example does not perform the charging mode selecting control as the charging control. The control device 30 according to the modified example performs the current feedback control so as to match the actual charging current ICR with a predetermined charging current IC after the initial value setting control. The control device 30 according to the second embodiment may be modified in the same manner.

The control device 30 according to the first embodiment selects one of the rapid charging mode and the normal charging mode depending on whether the vehicle speed VS in the charging mode selecting control is equal to or lower than the vehicle speed threshold value VK (step S41). The manner of selecting the charging mode is not limited to that in the first embodiment. For example, the control device 30 according to a modified example selects one of the rapid charging mode and the normal charging mode depending on whether the steering torque $\tau$ is equal to or larger than a torque threshold value $\tau K$, instead of performing the process in step S41. When the steering torque $\tau$ is equal to or larger than the torque threshold value $\tau K$, the rapid charging mode is selected. When the steering torque $\tau$ is smaller than the torque threshold value $\tau K$, the normal charging mode is selected. The torque threshold value $\tau K$ is set in advance by experiments or the like. In other words, the control device 30 needs to be configured to select the rapid charging mode on the basis of the estimation that the source power PS is equal to or larger than the charging-discharging threshold value KE, and the control device 30 needs to be configured to select the normal charging mode on the basis of the estimation that the source power PS is smaller than the charging-discharging threshold value KE.

The control device 30 according to the second embodiment changes the target charging current ICG on the basis of the difference between the EPS power consumption and the charging-discharging threshold value KE. However, the target charging current ICG is not limited to that in the second embodiment. For example, the control device 30 according to a modified example sets the target charging current ICG to a first target charging current ICG1 when the magnitude of the difference between the EPS power consumption and the charging-discharging threshold value KE is smaller than a first threshold value. The control device 30 according to the modified example sets the target charging current ICG to a second target charging current ICG2 larger than the first target charging current ICG1 when the magnitude of the difference between the EPS power consumption and the charging-discharging threshold value KE is equal to or larger than the first threshold value. The control device 30 according to the modified example may set three or more types of target charging currents using plural threshold values.

The control device 30 according to each of the first and second embodiments determines whether to perform the charging control depending on whether the capacitor 45 is fully charged in the power supply control (step S13). However, the determination on whether to perform the charging control is not limited to that in each of the above-described embodiments. For example, the control device 30 according to a modified example determines whether to perform the charging control depending on whether the capacitor voltage V2 is equal to or higher than a predetermined voltage threshold value lower than the fully-charged voltage, instead of performing the process in step S13, in the power supply control. The control device 30 according to the modified example does not perform the charging control when the capacitor voltage V2 is equal to or higher than the voltage threshold value. The control device 30 according to the modified example performs the charging control when the capacitor voltage V2 is lower than the voltage threshold value.

The control device 30 according to each of the first and second embodiments sets the initial duty ratio to 0% when the capacitor voltage V2 is equal to or lower than the output voltage V1 in the initial value setting control. However, the value of the initial duty ratio when the capacitor voltage V2 is equal to or lower than the output voltage V1 is not limited to that in each of the above-described embodiments. For example, the control device 30 according to a modified example sets the initial duty ratio to a value larger than 0% when the capacitor voltage V2 is equal to the output voltage V1 in the initial value setting control. The control device 30 according to the modified example sets the initial duty ratio to decrease with a decrease of the capacitor voltage V2 when the capacitor voltage V2 is lower than the output voltage V1 in the initial value setting control.

The control device 30 according to each of the first and second embodiments sets the initial duty ratio to 0% when the capacitor voltage V2 is equal to the output voltage V1 in the initial value setting control. However, the relationship between the capacitor voltage V2 and the output voltage V1, and the initial duty ratio is not limited to that in each of the above-described embodiments. For example, the control device 30 according to a modified example sets the initial duty ratio to 0% when the capacitor voltage V2 is lower than the output voltage V1 and the absolute value of the difference between the capacitor voltage V2 and the output voltage V1 is equal to or larger than a voltage difference threshold value. The voltage difference threshold value is the upper limit of a voltage difference range in which a large electric current can be prevented from flowing to the booster circuit 43 due to the voltage difference between the output voltage V1 and the capacitor voltage V2. The voltage difference threshold value is set in advance by experiments or the like.

The map MP according to each of the first and second embodiments represents the relationship between the capacitor voltage V2 and the initial duty ratio. However, the details of the map MP are not limited to those in each of the above-described embodiments. For example, the map MP in a modified example represents a relationship between the initial duty ratio and the voltage difference between the capacitor voltage V2 and the output voltage V1. In the map MP in the modified example, the initial duty ratio is set to increase with an increase in a value obtained by subtracting the output voltage V1 from the capacitor voltage V2 when the capacitor voltage V2 is equal to or higher than the output voltage V1. In the map MP in the modified example, the initial duty ratio is set to 0%, when the capacitor voltage V2 is equal to or lower than the output voltage V1 and the value obtained by subtracting the output voltage V1 from the capacitor voltage V2 is equal to or lower than "0".

In the map MP in the modified example, the initial duty ratio may be set to decrease with a decrease in the value obtained by subtracting the output voltage V1 from the capacitor voltage V2 when the capacitor voltage V2 is equal to or lower than the output voltage V1.

The control device 30 according to each of the first and second embodiments sets the initial duty ratio so as to match the boosted voltage V3 of the booster circuit 43 with the capacitor voltage V2 in the initial value setting control. However, the manner of setting the initial duty ratio is not limited to that in each of the above-described embodiments. For example, the control device 30 according to a modified example sets the initial duty ratio so that the boosted voltage V3 of the booster circuit 43 is within a predetermined range including the capacitor voltage V2 in the initial value setting control. The predetermined range is a range of the voltage difference between the boosted voltage V3 and the capacitor voltage V2, in which a failure can be prevented from occurring in the switching element 43A due to a large electric current flowing from the main power source 4 to the booster circuit 43. The control device 30 according to another modified example sets the initial duty ratio so that the boosted voltage V3 is higher than the capacitor voltage V2 in the initial value setting control.

The auxiliary power supply device 40 according to each of the first and second embodiments includes the capacitor 45. However, the configuration of the auxiliary power supply device 40 is not limited to that in each of the above-described embodiments. For example, the auxiliary power supply device 40 according to a modified example includes a secondary battery such as a lithium ion battery, instead of the capacitor 45.

The electric double layer capacitor is used as the capacitor 45 in each of the first and second embodiments. However, the type of the capacitor 45 is not limited to that in each of the above-described embodiments. For example, as the capacitor 45 according to a modified example, a lithium ion capacitor is used, instead of the electric double layer capacitor.

In the booster circuits 43 in each of the first and second embodiments, MOSFETs are used as the switching elements 43A and 43B. However, the type of the switching elements 43A and 43B is not limited to that in each of the above-described embodiments. For example, in the booster circuit 43 according to a modified example, insulated gate bipolar transistors (IGBTs) are used as the switching elements 43A and 43B. In other words, a configuration other than the MOSFET may be used as long as it can change the duty ratios of the switching elements 43A and 43B.

The electric motor 21 in each of the first and second embodiments has the configuration of the three-phase brushless motor. However, the configuration of the electric motor 21 is not limited to that in each of the above-described embodiments. For example, the electric motor 21 according to a modified example has a configuration of a motor with a brush.

The auxiliary power supply device 40 according to each of the first and second embodiments may have plural capacitors 45. The auxiliary power supply device 40 according to the first embodiment is applied to the EPS 1. However, the range, to which the auxiliary power supply device 40 is applied, is not limited to the EPS 1. For example, the auxiliary power supply device 40 according to a modified example is applied to a machine tool.

The EPS 1 according to each of the first and second embodiments has the configuration of the column assist type. However, the configuration of the EPS 1 is not limited to that in each of the above-described embodiments. For example, the EPS 1 according to a modified example has a configuration of a pinion assist type, a dual pinion assist type, a rack coaxial type, or a rack parallel type. The EPS 1 according to another modified example has a configuration of a steer-by-wire type.

The configurations that can be made on the basis of the above-described embodiments will be described below, together with advantageous effects. In the auxiliary power supply device, the control device decreases the voltage that is applied to the auxiliary power source by the booster circuit, with a decrease in the voltage across terminals of the auxiliary power source when the supply of electric power from the main power source to the auxiliary power source is started in a state where the voltage across terminals of the auxiliary power source is equal to or lower than the voltage of the main power source.

In the auxiliary power supply device, the voltage difference between the voltage across terminals of the auxiliary power source and the voltage applied to the auxiliary power source by the booster circuit decreases when the supply of electric power from the main power source to the auxiliary power source is started. Accordingly, when the supply of electric power from the main power source to the auxiliary power source is started, a large electric current is prevented from flowing from the main power source to the booster circuit. Therefore, when the supply of electric power from the main power source to the auxiliary power source is started, it is possible to appropriately supply an electric current from the main power source to the auxiliary power source.

In the electric power steering system, the control device supplies a first reference current from the main power source to the auxiliary power source when it is estimated that the source power, which is the electric power of the main power source consumed by the electric power steering system due to the assist control, is equal to or larger than the charging-discharging threshold value that is a reference value for switching between charging of the auxiliary power source by the main power source and discharging from the auxiliary power source to the electric motor, and the control device supplies a second reference current smaller than the first reference current from the main power source to the auxiliary power source when it is estimated that the source power is smaller than the charging-discharging threshold value.

When the source power is equal to or larger than the charging-discharging threshold value, it is preferable, from the viewpoint of reducing the load of the main power source, that the auxiliary power source should discharge an electric current to the electric motor. Accordingly, when the source power is equal to or larger than the charging-discharging threshold value, it is preferable that the auxiliary power source should have a sufficient amount of stored electricity. Therefore, when the source power is equal to or larger than the charging-discharging threshold value and the auxiliary power source does not have a sufficient amount of stored electricity, it is preferable that the auxiliary power source should be rapidly charged.

When the source power is smaller than the charging-discharging threshold value, it is not necessary to discharge an electric current from the auxiliary power source to the electric motor. Accordingly, when the source power is smaller than the charging-discharging threshold value and the auxiliary power source does not have a sufficient amount of stored electricity, it is not necessary to rapidly charge the auxiliary power source.

Therefore, in the electric power steering system according to the invention, the first reference current is supplied to the auxiliary power source when it is estimated that the source power is equal to or larger than the charging-discharging threshold value, and the second reference current smaller than the first reference current is supplied to the auxiliary power source when it is estimated that the source power is smaller than the charging-discharging threshold value. Accordingly, when it is estimated that the source power is equal to or larger than the charging-discharging threshold value, the auxiliary power source is rapidly charged.

What is claimed is:

1. An auxiliary power supply device comprising:
    an auxiliary power source that is connected to a main power source, and that is able to discharge an electric current to an electric motor, the main power source supplying electric power to the electric motor; and
    a booster circuit that boosts a voltage of the main power source and applies the boosted voltage to the auxiliary power source,
    wherein when supply of the electric power from the main power source to the auxiliary power source is started in a state where a voltage across terminals of the auxiliary power source is higher than the voltage of the main power source, the voltage applied to the auxiliary power source by the booster circuit increases with an increase in the voltage across the terminals of the auxiliary power source.

2. The auxiliary power supply device according to claim 1, wherein when the supply of the electric power from the main power source to the auxiliary power source is started, the voltage applied to the auxiliary power source by the booster circuit is equal to or higher than the voltage across the terminals of the auxiliary power source.

3. The auxiliary power supply device according to claim 1, wherein when the supply of the electric power from the main power source to the auxiliary power source is started in a state where the voltage across the terminals of the auxiliary power source is equal to or lower than the voltage of the main power source and an absolute value of a difference between the voltage of the main power source and the voltage across the terminals of the auxiliary power source is equal to or larger than a voltage difference threshold value, the voltage applied to the auxiliary power source by the booster circuit is equal to the voltage of the main power source.

4. The auxiliary power supply device according to claim 2, wherein when the supply of the electric power from the main power source to the auxiliary power source is started in a state where the voltage across the terminals of the auxiliary power source is equal to or lower than the voltage of the main power source and an absolute value of a difference between the voltage of the main power source and the voltage across the terminals of the auxiliary power source is equal to or larger than a voltage difference threshold value, the voltage applied to the auxiliary power source by the booster circuit is equal to the voltage of the main power source.

5. An electric power steering system comprising:
    an electric motor that generates an assist torque based on a steering torque;
    the auxiliary power supply device according to claim 1, and
    a control device that controls an operation of the auxiliary power supply device.

6. The electric power steering system according to claim 5, wherein the control device supplies a first reference current from the main power source to the auxiliary power source when a traveling speed of a vehicle is equal to or lower than a vehicle speed threshold value, and supplies a second reference current from the main power source to the auxiliary power source when the traveling speed of the vehicle is higher than the vehicle speed threshold value, the second reference current being smaller than the first reference current.

7. The electric power steering system according to claim 5, wherein when the electric power is supplied from the main power source to the auxiliary power source in a state where power consumption of the electric power steering system is smaller than a charging-discharging threshold value that is a reference value for switching between charging of the auxiliary power source by the main power source and discharging from the auxiliary power source to the electric motor, the control device changes a magnitude of an electric current supplied from the main power source to the auxiliary power source based on a difference between the power consumption of the electric power steering system and the charging-discharging threshold value.

8. An electric power steering system comprising:
    an electric motor that generates an assist torque based on a steering torque;
    the auxiliary power supply device according to claim 2, and
    a control device that controls an operation of the auxiliary power supply device.

9. An electric power steering system comprising:
    an electric motor that generates an assist torque based on a steering torque;
    the auxiliary power supply device according to claim 3, and
    a control device that controls an operation of the auxiliary power supply device.

10. An electric power steering system comprising:
    an electric motor that generates an assist torque based on a steering torque;
    the auxiliary power supply device according to claim 4, and
    a control device that controls an operation of the auxiliary power supply device.

* * * * *